United States Patent
Saito

(10) Patent No.: US 8,086,369 B2
(45) Date of Patent: Dec. 27, 2011

(54) BRAKE HOLD CONTROL DEVICE

(75) Inventor: Kimio Saito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 370 days.

(21) Appl. No.: 12/524,317

(22) PCT Filed: Mar. 10, 2008

(86) PCT No.: PCT/JP2008/054832
§ 371 (c)(1),
(2), (4) Date: Jul. 23, 2009

(87) PCT Pub. No.: WO2008/123032
PCT Pub. Date: Oct. 16, 2008

(65) Prior Publication Data
US 2010/0100278 A1    Apr. 22, 2010

(30) Foreign Application Priority Data

Mar. 20, 2007  (JP) ................. 2007-073355

(51) Int. Cl.
*G06F 19/00* (2006.01)
(52) U.S. Cl. ........................ 701/34; 701/36
(58) Field of Classification Search .......... 701/29, 701/31, 34, 36, 45, 70, 76, 104; 303/122.03, 303/122.05, 125
See application file for complete search history.

(56) References Cited

U.S. PATENT DOCUMENTS

| | | | | |
|---|---|---|---|---|
| 4,967,866 A | * | 11/1990 | Maehara | 180/197 |
| 6,863,355 B2 | * | 3/2005 | Nishio et al. | 303/140 |

FOREIGN PATENT DOCUMENTS

| | | |
|---|---|---|
| JP | 7-040817 A | 2/1995 |
| JP | 7-101321 A | 4/1995 |
| JP | 8-142819 A | 6/1996 |
| JP | 9-191501 A | 7/1997 |
| JP | 2001-260699 A | 9/2001 |
| JP | 2003-220937 A | 8/2003 |
| JP | 2004-058937 A | 2/2004 |
| JP | 2006-306351 A | 11/2006 |
| JP | 2007-055474 A | 3/2007 |

* cited by examiner

*Primary Examiner* — Richard M. Camby
(74) *Attorney, Agent, or Firm* — Kenyon & Kenyon LLP

(57) ABSTRACT

A brake hold control device includes a brake actuator having an electromagnetic valve for holding braking force of a vehicle, two accelerator opening degree sensors for control and for defect detection that detect an accelerator opening degree, and a brake ECU that receives detection signals from the two accelerator opening degree sensors as input. The brake ECU releases braking force when predetermined held-brake release conditions, including accelerator opening degree conditions, for releasing a held brake are satisfied. The accelerator opening degree conditions for releasing a held brake are set such that both of the accelerator opening degrees corresponding to the detection signals from both of the two accelerator opening degree sensors are greater than a predetermined opening degree.

3 Claims, 6 Drawing Sheets

BRAKE HOLD CONTROL DEVICE

This is a 371 national phase application of PCT/JP2008/054832 filed 10 Mar. 2008, claiming priority to Japanese Patent Application No. JP 2007-073355 filed 20 Mar. 2007, the contents of which are incorporated herein by reference.

TECHNICAL FIELD

The present invention relates to a brake hold control device having a braking force holding section that holds braking force of a vehicle and a control section, in which the control section controls the braking force holding section to hold the braking force when predetermined braking force holding conditions are satisfied, and controls the braking force holding section to release the braking force when predetermined held-brake release conditions are satisfied.

BACKGROUND ART

Conventionally, a brake hold control device for a vehicle is known. The brake hold control device enables a driver of a vehicle to maintain a stop state without depressing a brake pedal when the vehicle stops at a red light or stops due to a traffic jam, and to start the vehicle only by depressing an accelerator pedal, thereby reducing a load on the driver imposing by repetition of frequent stops and starts of the vehicle.

As such a brake hold control device, a configuration disclosed in Patent Document 1 is known. The brake hold control device disclosed in Patent Document 1 has a vehicle speed detecting section that detects a vehicle speed, a holding section that holds braking force, an increased depression detecting section that detects increased depression of a brake pedal, and a control section. The control section activates the holding section if the increased depression is detected when the vehicle speed is equal to or lower than a first predetermined value.

Further, Patent Document 2 discloses a hybrid vehicle provided with an engine and a motor as a driving source of the vehicle, further provided with a plurality of accelerator sensors for providing an accelerator opening degree as control input, and an accelerator opening degree determining section that, when it is detected that part of the plurality of accelerator sensors is defective, determines the accelerator opening degree using an output of a normal sensor other than the defective sensor. Further, the accelerator opening degree determining section divides a range of an output signal level of the normal sensor into a plurality of regions including an opening operation region and a closing operation region and determines a change of the accelerator opening degree according to the region into which the output signal level of the normal sensor is allocated.

Patent Document 1: JP 8-142819 A
Patent Document 2: JP 2001-260699 A

DISCLOSURE OF THE INVENTION

The brake hold control device disclosed in above-described Patent Document 1 is configured to, when the holding section holds braking force, determine whether or not an accelerator pedal is depressed using a throttle position sensor, and, if the accelerator pedal is depressed, release the braking force. However, if the throttle position sensor is defective, there is a possibility that, while the braking force is being held, although the accelerator pedal is not depressed, the vehicle starts by a signal indicating that the accelerator pedal is depressed being sent to the control section. Because a driver who operates the vehicle provided with the brake hold control device takes his foot off the brake pedal while the holding section holds the braking force, the driver is frightened with sudden start of the vehicle, which may make it difficult for the driver to take instantaneous response. Accordingly, there is room for improvement in ensuring safety effectively.

Further, conventionally, when transiting a state from normal stop of running to a state where the holding section holds the braking force, it is considered that the transition conditions include a condition that the accelerator opening degree corresponding to the amount of operation of the accelerator pedal is equal to or lower than a predetermined level, along with other conditions. However, in the case of such a configuration, if the accelerator opening degree sensor for detecting an accelerator opening degree as well as a sensor for determining the other conditions are defective, there is a possibility that, although the accelerator pedal is depressed, it is determined that the foot is taken off from the accelerator pedal, and the holding section for holding the braking force is activated. Also from this aspect, there is room for improvement in ensuring safety effectively.

Further, the hybrid vehicle disclosed in Patent Document 2 is only directed to using a normal accelerator sensor when one of a plurality of accelerator sensors is defective, and does not relate to a vehicle provided with the brake hold control device. The vehicle provided with the brake hold control device can be also configured to use a normal accelerator sensor, if one of the plurality of accelerator sensors is merely defective. However, in this case, there is a possibility that, before it is determined that the accelerator sensor is defective, erroneous determination of the accelerator opening degree of the defective accelerator sensor may appear as large vehicle behavior.

For example, in torque control in normal driving, even if the accelerator opening degree information of the accelerator sensor is erroneously determined before it is determined that the accelerator sensor is defective, a commanded torque can control a torque change such that the torque does not change excessively and rapidly. Therefore, there is no, or if any, little possibility that this erroneous determination may appear as vehicle behavior. In contrast to this, because the brake hold control device can use opening degree information of the accelerator sensor to determine switching of the state from a stop maintaining state where the stop state is maintained without the brake pedal being depressed to a start state, or switching of the state from an approximately stopped state such as a creep state, or a stop state to the stop maintaining state, if the accelerator sensor is defective and the opening degree information of the accelerator sensor is erroneously determined, there is a possibility that, before it is determined that the accelerator sensor is defective, a rapid torque change is not controlled, and the erroneous determination may appear as vehicle behavior large enough to be recognized by the driver. For example, even if a defect occurs in the accelerator sensor while the stop state is maintained, there is a possibility that, before it is determined that the accelerator sensor is defective, the accelerator sensor erroneously determines that the accelerator opening degree indicates that the accelerator is open although the accelerator pedal is not depressed, and large vehicle behavior that the vehicle suddenly starts may appear. Therefore, it is desired to realize a means that can effectively prevent start of the vehicle which is not expected by the driver while the holding section that holds the braking force is activated.

It is therefore an object of the present invention to effectively prevent a behavior change of the vehicle, such as start of the vehicle which is not expected by the driver, in the brake hold control device, when the accelerator opening degree sensor includes a defect such as a failure.

In the brake hold control device according to the present invention, the brake hold control device according to a first aspect has a braking force holding section that holds braking force of a vehicle, a plurality of accelerator opening degree sensors that detect an accelerator opening degree corresponding to the amount of operation of an accelerator pedal, and a control section that receives detection signals from the plurality of accelerator opening degree sensors as input, in which the control section controls the braking force holding section to hold the braking force when predetermined braking force holding conditions are satisfied, and controls the braking force holding section to release the braking force when predetermined held-brake release conditions including accelerator opening degree conditions for releasing a held brake are satisfied, and the accelerator opening degree conditions for releasing a held brake are set such that accelerator opening degrees corresponding to detection signals from all the plurality of accelerator opening degree sensors are greater than a predetermined lower limit opening degree for releasing a held brake.

Further, preferably, the braking force holding conditions include accelerator opening degree conditions for holding braking force, and the accelerator opening degree conditions for holding braking force are set such that the accelerator opening degrees corresponding to the detection signals from all the plurality of accelerator opening degree sensors are smaller than a predetermined upper limit opening degree for holding braking force.

Further, more preferably, the brake hold control device has a vehicle speed sensor that detects a vehicle speed, and a brake sensor that detects an ON/OFF state of the brake pedal, in which the control section receives detection signals from the vehicle speed sensor, the brake sensor and the plurality of accelerator opening degree sensors as input, and the braking force holding conditions are set such that the vehicle speed is equal to or lower than a predetermined speed, an ON state of the brake pedal continues for a predetermined period or longer, and the accelerator opening degree conditions for holding braking force are satisfied, and the held-brake release conditions are set such that the accelerator opening degree conditions for releasing a held brake are satisfied.

Further, in the brake hold control device according to the present invention, the brake hold control device according to a second aspect has a braking force holding section that holds braking force of a vehicle, a plurality of accelerator opening degree sensors that detect an accelerator opening degree corresponding to the amount of operation of an accelerator pedal, and a control section that receives detection signals from the plurality of accelerator opening degree sensors as input, in which, when predetermined braking force holding conditions are satisfied, the control section controls the braking force holding section to hold the braking force, and, when predetermined held-brake release conditions are satisfied, the control section controls the braking force holding section to release the braking force, and, before it is determined that the accelerator opening degree sensor is defective, and, when at least two accelerator opening degrees are different out of the accelerator opening degrees corresponding to the detection signals from the plurality of accelerator opening degree sensors, the control section continues to maintain an operating state of the braking force holding section.

According to the brake hold control device of the first aspect of the present invention, because the accelerator opening degree conditions for releasing a held brake are set such that the accelerator opening degrees corresponding to the detection signals from all the plurality of accelerator opening degree sensors are greater than a lower limit opening degree for releasing a held brake, even if the accelerator opening degrees corresponding to the detection signals from part of the accelerator opening degree sensors out of the plurality of accelerator opening degree sensors are greater than the lower limit opening degree for releasing a held brake, if the accelerator opening degrees corresponding to the detection signals from the remaining accelerator opening degree sensors are equal to or smaller than the lower limit opening degree for releasing a held brake, the held-brake release conditions are not satisfied. Therefore, even if part of the plurality of accelerator opening degree sensors includes a defect such as a failure, and the accelerator opening degrees corresponding to the detection signals from part of the accelerator opening degree sensors are greater than the lower limit opening degree for releasing a held brake, the braking force is not released, and, before it is determined that the accelerator opening degree sensor is defective, start of the vehicle, which is a behavior change of the vehicle not expected by the driver, can be effectively prevented while the braking force is held. As a result, it is possible to effectively ensure safety of a vehicle with the brake hold control device.

Further, according to the configuration in which the braking force holding conditions include the accelerator opening degree conditions for holding braking force, and the accelerator opening degree conditions for holding braking force are set such that the accelerator opening degrees corresponding to the detection signals from all the plurality of accelerator opening degree sensors are smaller than a predetermined upper limit opening degree for holding braking force, even if the accelerator opening degrees corresponding to the detection signals from part of the accelerator opening degree sensors out of the plurality of accelerator opening degree sensors are smaller than the upper limit opening degree for holding braking force, if the accelerator opening degrees corresponding to the detection signals from the other accelerator opening degree sensors are equal to or greater than the upper limit opening degree for holding braking force, the braking force holding conditions are not satisfied. Therefore, even if one of the two accelerator opening degree sensors includes a defect such as a failure, and the accelerator opening degree corresponding to a detection signal from one accelerator opening degree sensor is smaller than the upper limit opening degree for holding braking force, the braking force is not held before it is determined that the accelerator opening degree sensor is defective, so that it is possible to effectively prevent the state from shifting to a braking force holding state when the accelerator opening degree sensor is defective. As a result, it is possible to effectively ensure safety of a hybrid vehicle, which is a vehicle with the brake hold control device.

Further, according to the brake hold control device of the second aspect of the present invention, before it is determined that the accelerator opening degree sensor is defective, and, when at least two accelerator opening degrees are different out of the accelerator opening degrees corresponding to the detection signals from the plurality of accelerator opening degree sensors, the control section continues to maintain an operating state of the braking force holding section as is, so that, when part of the plurality of accelerator opening degree sensors includes a defect such as a failure, the operating state of the braking force holding section is not changed based on the detected value of the defective accelerator opening degree sensor. Therefore, it is possible to effectively prevent a behavior change of the vehicle such as start of the vehicle not expected by the driver, while the braking force is held, and, before it is determined that the accelerator opening degree sensor is defective. As a result, it is possible to ensure safety of the vehicle with the brake hold control device effectively.

Figure 1:
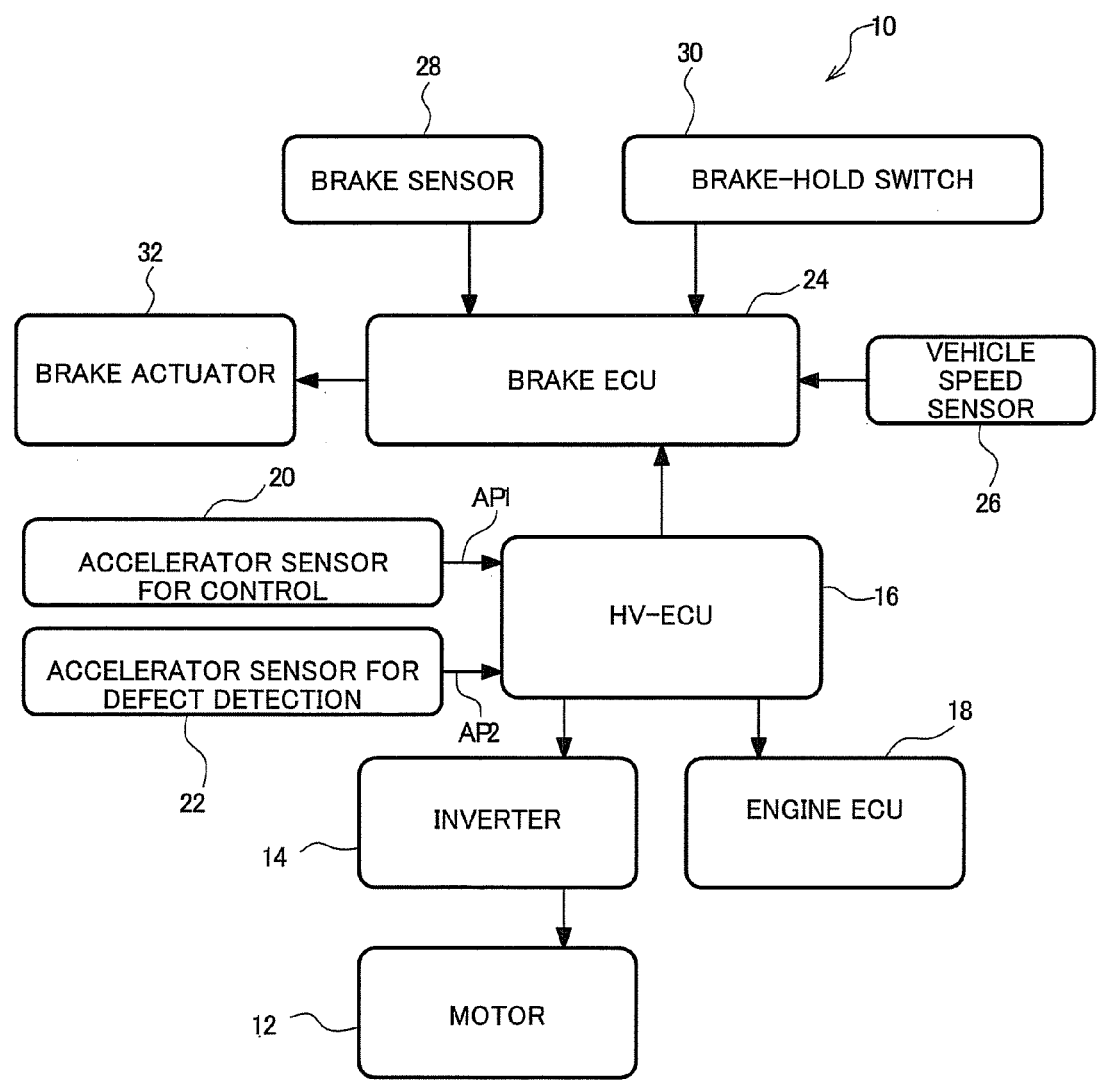
FIG. 1 is a block diagram schematically showing a structure of a hybrid vehicle, which is a vehicle with a brake hold control device provided with a brake hold control device according to a first embodiment of the present invention.

REFERENCE NUMERALS 10 hybrid vehicle
12 running motor
14 inverter
16 HV-ECU
18 engine ECU
20 accelerator opening degree sensor for control
22 accelerator opening degree sensor for defect detection
24 brake ECU
26 vehicle speed sensor
28 brake sensor
30 brake-hold switch
32 brake actuator
34 vehicle with an engine

BEST MODE FOR CARRYING OUT THE INVENTION

First Embodiment

Embodiments of the present invention will be described below with reference to the drawings. FIGS. 1 to 5 show the first embodiment of the present invention. FIG. 1 is a block diagram schematically showing a structure of a hybrid vehicle 10, which is a vehicle with a brake hold control device provided with a brake hold control device according to this embodiment. As shown in FIG. 1, the hybrid vehicle 10 has an engine (not shown) and a running motor 12 as a driving source of the vehicle, an inverter 14 that sends a signal for driving to the running motor 12, and an HV controller (hybrid controller), that is, an HV-ECU 16. The HV-ECU 16 sends a control signal to the inverter 14 that drives the running motor 12. Further, the HV-ECU 16 sends a control signal to an engine ECU 18 that drives the engine. The HV-ECU 16 is an ECU that computes driving force, and is an integrated controller.

The HV-ECU 16 receives detection signals from an accelerator opening degree sensor 20 for control and an accelerator opening degree sensor 22 for defect detection, which are two accelerator opening degree sensors that detect an accelerator opening degree corresponding to the amount of operation of an accelerator pedal, and which are potentiometers. The detection signals from the two accelerator opening degree sensors 20 and 22 for control and for defect detection are inputted to a brake oil pressure controller, that is, a brake ECU 24, which is a control section, via the HV-ECU 16. The HV-ECU 16, engine ECU 18 and brake ECU 24 are respectively configured with micro computers having, for example, a CPU and a memory. Further, the HV-ECU 16 has a function of determining the control amount such as output distribution between the engine and the running motor 12.

Further, the brake ECU 24 receives detection signals from the vehicle speed sensor 26 that detects a vehicle speed and a brake sensor 28 that detects an ON/OFF state of a brake pedal, and a signal indicating an ON/OFF state of a brake-hold switch 30, which is an operating section, as input. The brake ECU 24 controls a brake actuator 32 of the hydraulic brake according to the result computed from the inputted signals. The brake actuator 32 has a function of optimally distributing an oil pressure to brake components such as wheel cylinders of hydraulic drum brakes provided at four or two wheels and calipers of hydraulic disk brakes, and has a hydraulic pressure source such as a hydraulic pump, and an electromagnetic valve (not shown). Such a configuration enables the brake actuator 32 to control a braking state of the wheels. Further, the brake sensor 28 detects an ON state of the brake pedal, that is, whether the brake pedal (not shown) is depressed, or an OFF state of the brake pedal, that is, whether the brake pedal is not depressed. For this purpose, for example, the brake sensor is configured with a sensor that detects a stroke of the brake pedal, or a sensor that detects a pressure applied to the brake pedal, or both of the sensors. It is also possible to use a means that detects a pressure applied to the brake pedal as the brake sensor 28 to detect that the brake pedal is depressed, for example, by detecting that this pressure is equal to or greater than a predetermined pressure, or greater than a normal reference depressed pressure.

Further, the brake actuator 32 has an electromagnetic valve for holding braking force (not shown) which is a braking force holding means that holds braking force of a vehicle, and by activating the electromagnetic valve for holding braking force, a brake oil pipe (not shown) is blocked inside, and, for example, by maintaining a constant pressure of a brake oil in the wheel cylinders provided corresponding to four or two wheels or in the hydraulic cylinders in the calipers, the braking force is held, that is, the braking force holding state is realized. Further, when the operation of the electromagnetic valve for holding braking force is stopped, the blocked brake oil pipe is released, and thereby the wheel cylinders or the hydraulic cylinders in the calipers and an oil tank are connected, and the braking force is released, that is, the braking force holding state is released.

Further, the brake-hold switch 30 is provided around the driver's seat, and is a switch for switching the state between an ON state and an OFF state for selecting whether or not to execute a braking force holding function according to predetermined braking force holding conditions. It is also possible to provide an engine start motor and an inverter for driving the engine start motor separately from the inverter 14 and the running motor 12. Further, it is also possible to use the running motor 12 and the engine start motor as a means for generating electricity or as a means for regenerating electric power when the vehicle is decelerated.

In such a hybrid vehicle 10, the brake hold control device according to this embodiment is configured with a brake sensor 28, a brake-hold switch 30, a brake actuator 32, a brake ECU 24, a vehicle speed sensor 26, an HV-ECU 16, and two accelerator opening degree sensors 20 and 22. In this embodiment, the accelerator opening degree sensors 20 and 22 are redundantly provided as the accelerator opening degree sensor 20 for control and the accelerator opening degree sensor for defect detection, and input two accelerator position signals indicating respective accelerator opening degrees to the HV-ECU 16.

Figure 2:
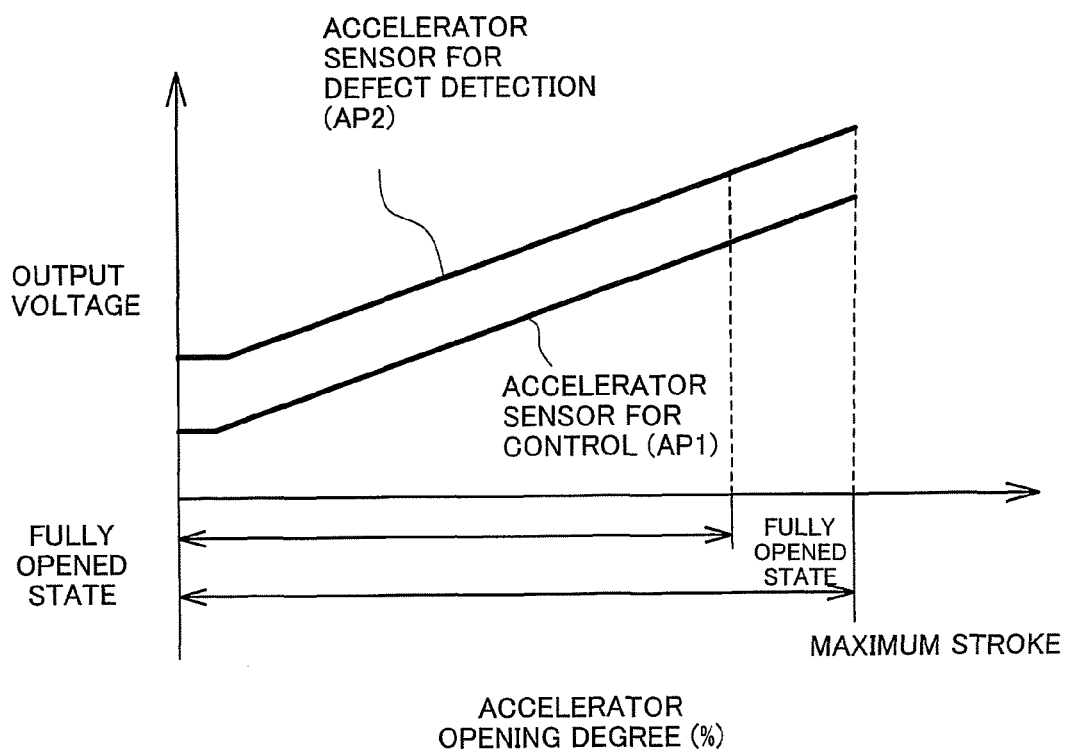
FIG. 2 is a diagram showing characteristics of an output voltage of two accelerator opening degree sensors for control and for defect detection with respect to an accelerator opening degree.

That is, the accelerator opening degree sensor 20 for control inputs an accelerator position signal indicating an accelerator opening degree AP1 to the HV-ECU 16, and the accelerator opening degree sensor 22 for defect detection inputs an accelerator position signal indicating an accelerator opening degree AP2 to the HV-ECU 16. In normal operation, the degrees of the accelerator opening degrees AP1 and AP2 are equal. FIG. 2 shows characteristics of these two accelerator opening degree sensors 20 and 22 using a relationship between the output voltages and the accelerator opening degrees AP1 and AP2. As shown in FIG. 2, a difference between the output voltages with respect to the accelerator opening degree sensor 20 for control and the accelerator opening degree sensor 22 for defect detection is equal in the almost whole range until the accelerator opening degree reaches a maximum stroke of the accelerator pedal. That is, in the two accelerator opening degree sensors 20 and 22, the output voltages with respect to the accelerator opening degrees AP1 and AP2 have characteristics that slopes are equal and offsets are different when the accelerator opening degrees AP1 and AP2 are equal to or greater than a predetermined opening degree. It is also possible to make the slopes of the output voltages with respect to the accelerator opening degrees AP1 and AP2 different from each other in the two accelerator opening degree sensors 20 and 22. In addition, in FIG. 2, although "fully opened state" of the accelerator opening degree is shown at a position where the accelerator opening degree is smaller than the maximum stroke of the accelerator pedal, when the accelerator opening degree is greater than the "fully opened state", a signal indicating that the accelerator opening degree is 100% is always sent to the HV-ECU 6 (FIG. 1).

In the two accelerator opening degree sensors 20 and 22, during normal running where a defect is not detected, the HV-ECU 16 uses the detection signal of the accelerator opening degree sensor 20 for control to determine a commanded torque, which is a target vehicle driving torque. In contrast to this, the accelerator opening degree sensor 22 for defect detection monitors whether the accelerator opening degree sensor 20 for control is normal, that is, whether or not a difference between the output voltages of the accelerator opening degree sensor 20 for control and the accelerator opening degree sensor 22 for defect detection with respect to the same accelerator opening degree is always constant or within a certain range. The HV-ECU 16 determines that the two accelerator opening degree sensors 20 and 22 are normal if the difference between the output voltages of the two accelerator opening degree sensors 20 and 22 is constant or within a certain range, and determines that one of the accelerator opening degree sensor 20 (or 22) is defective if a state where this difference is not constant or falls outside a certain range continues for a predetermined normal/defective determining period a or longer. If it is determined that the accelerator opening degree sensor 20 (or 22) is defective, the normal accelerator opening degree sensor 20 (or 22) is used to determine the commanded torque.

Further, when predetermined braking force holding conditions including accelerator opening degree conditions for holding braking force are satisfied, the brake ECU 24 activates the electromagnetic valve for holding braking force to create a braking force holding state where the braking force is held. As described in detail later, the braking force holding conditions are set such that a vehicle speed V is lower than a predetermined speed V1 which is set in advance, an ON state of the brake pedal continues for a predetermined period T or longer, and the accelerator opening degree conditions for holding braking force are satisfied. Further, the accelerator opening degree conditions for holding braking force are set such that the accelerator opening degrees AP1 and AP2 which are indicated by the detection signals from both of the two accelerator opening degree sensors 20 and 22, that is, both of the accelerator opening degrees AP1 and AP2 corresponding to the both detection signals are smaller than a predetermined upper limit opening degree K1 for holding braking force (AP1<K1 and AP2<K1).

Furthermore, when predetermined held-brake release conditions including the accelerator opening degree conditions for releasing a held brake are satisfied, the brake ECU 24 stops operation of the electromagnetic valve for holding braking force to create a held-brake release state where the braking force is released. The held-brake release conditions are set such that the accelerator opening degree conditions for releasing a held brake are satisfied, and the accelerator opening degree conditions for releasing a held brake are set such that the accelerator opening degrees AP1 and AP2 corresponding to the two accelerator opening degree sensors 20 and 22 are both greater than a predetermined lower limit opening degree K2 for releasing a held brake (AP1>K1 and AP2>K2). That is, in this embodiment, before it is determined that the accelerator opening degree sensor 20 (or 22) includes a defect such as a failure, and when the accelerator opening degrees AP1 and AP2 corresponding to the detection signals from the two accelerator opening degree sensors 20 and 22 are different, the brake ECU 24 performs control to maintain an operating state of the electromagnetic valve for holding braking force as is. That is, if the electromagnetic valve for holding braking force operates, the electromagnetic valve for holding braking force is left operating to maintain the braking force holding state, and, if the operation of the electromagnetic valve for holding braking force is stopped, the operation is left stopped to maintain the held-brake release state. In this way, the brake hold control device determines to start the hybrid vehicle 10 or hold a stop state of the hybrid vehicle 10 according to situations of the accelerator opening degree sensors 20 and 22.

Figure 3:
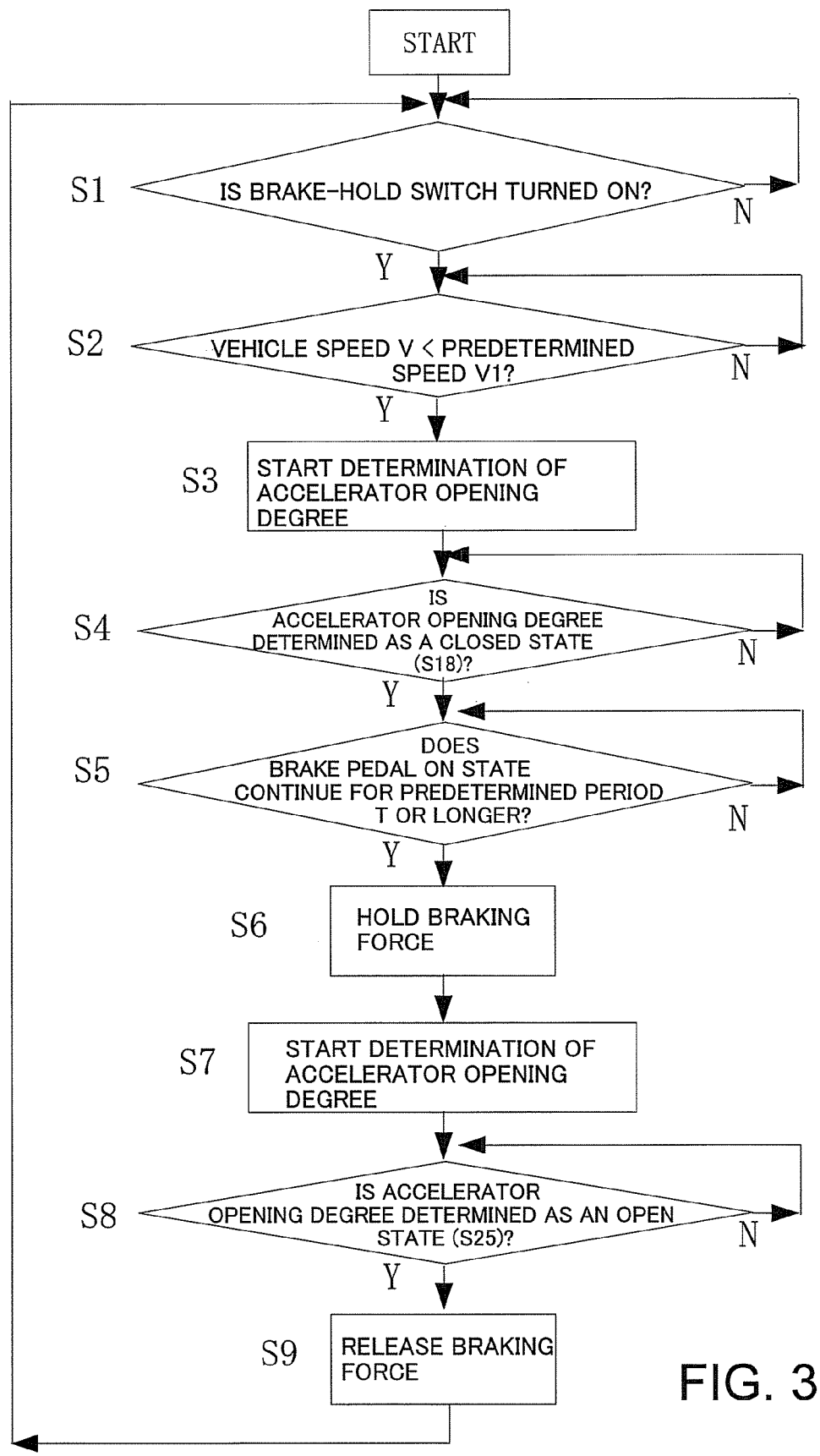
FIG. 3 is a flowchart for illustrating a control method of the brake hold control device according to the first embodiment.
Figure 4:
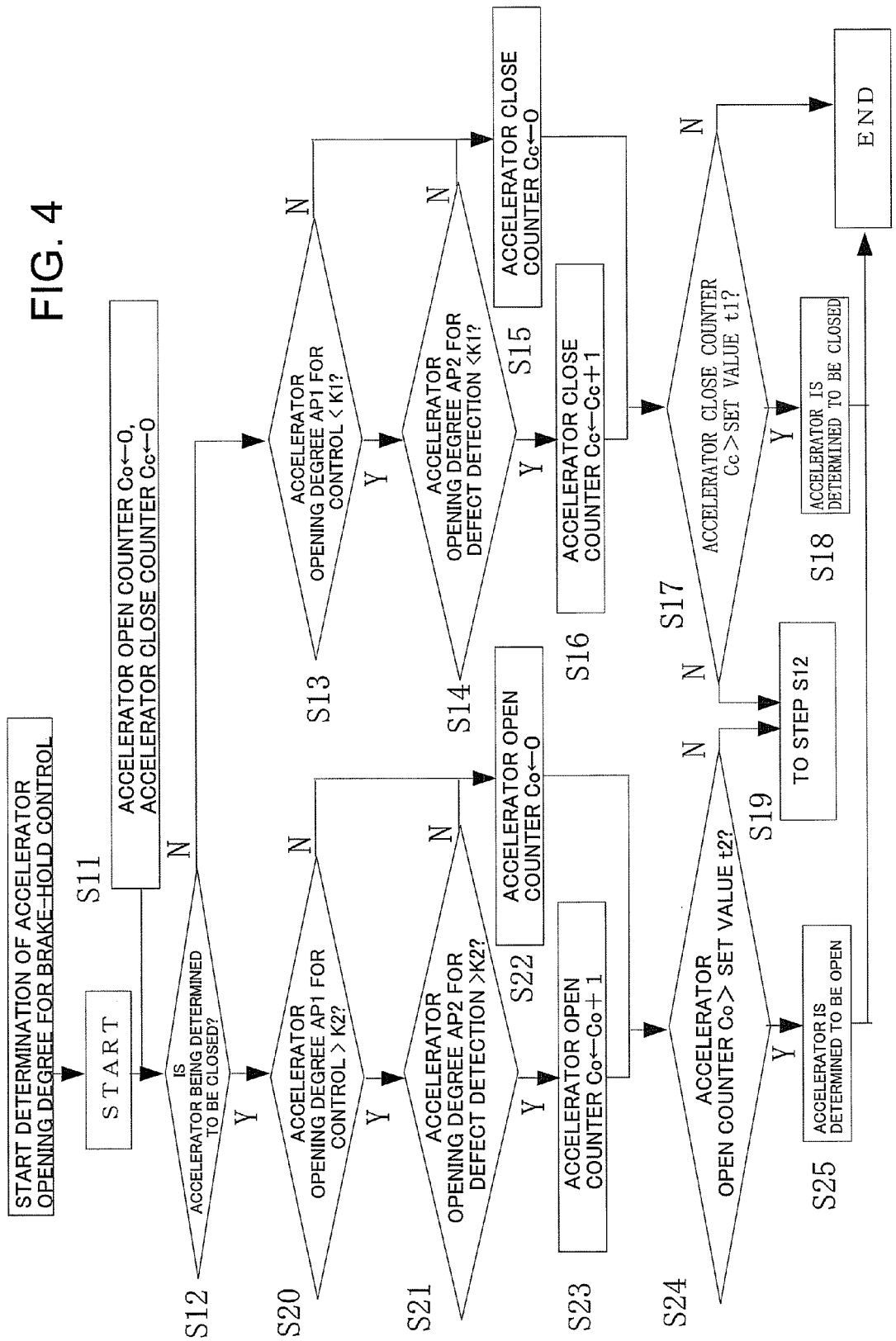
FIG. 4 is a flowchart showing an accelerator opening degree determination method for brake hold control, corresponding to steps S3, S4, S7 and S8 in FIG. 3.

FIGS. 3 and 4 are flowcharts for illustrating a control method for the brake hold control device in this embodiment. In step S1 in FIG. 3, the brake ECU 24 (FIG. 1) determines whether or not the brake-hold switch 30 is turned ON. If it is determined that the brake-hold switch 30 is turned ON, the flow shifts to step S2 in FIG. 3, and it is determined whether the vehicle speed V is lower than the predetermined speed V1 using the vehicle speed V indicated by a detection signal from the vehicle speed sensor 26 (FIG. 1) and the predetermined speed V1 which is set in advance. The predetermined speed V1 is, for example, 0 km/h (stop state) or 5 km/h (approximately stopped state). In step S2 in FIG. 3, if it is determined that the vehicle speed V is lower than the predetermined speed V1, the braking force holding condition 1 is satisfied, and the flow shifts to step S3, and determination of the accelerator opening degree for brake-hold control is started. In the determination of the accelerator opening degree for brake-hold control, the accelerator opening degree for brake-hold control is determined as an open state or a closed state by the two accelerator opening degree sensors 20 and 22. When the determination of the accelerator opening degree for brake-hold control is started, the processing of the flowchart shown in FIG. 4 is started.

First, in step S11 in FIG. 4, both of an accelerator open counter Co for determining an open state of the accelerator opening degree and an accelerator closed counter Cc for determining a closed state of the accelerator opening degree are set at 0. Then, in step S12, the brake ECU 24 determines whether or not the accelerator opening degree is being determined as a closed state (whether or not determination of a closed state is being performed). In a stage of step S3 in FIG. 3, because the accelerator opening degree is normally being determined as a closed state, the flow shifts from step S12 to step S13 in FIG. 4.

Here, in the flowchart in FIG. 4, in the processing from step S13 to step S19, after it is determined that the vehicle speed V becomes lower than the predetermined speed V1 from a normal driving state, by determining that the accelerator opening degree is a closed state, it is determined whether or not the braking force is held, that is, the accelerator opening degree conditions for holding braking force for shifting the state to the state where the braking force is held by the activation of the electromagnetic valve for holding braking force are satisfied.

In contrast to this, in the processing from step S20 to step S25 and step S19 in FIG. 4, when the accelerator opening degree is being determined as a closed state in response to a braking force holding state, that is, a state where braking force is held by determining that the accelerator opening degree is an open state by the accelerator pedal being depressed, it is determined whether or not the accelerator opening degree conditions for releasing a held brake for shifting the state to a state for starting the vehicle by releasing a held brake, that is, releasing the braking force, are satisfied.

When the flow shifts to step S13 after it is determined that the accelerator opening degree is being determined as a closed state in step S12 in FIG. 4, the brake ECU 24 (FIG. 1) determines in step S13 whether or not the accelerator opening degree AP1 corresponding to the accelerator opening degree sensor 20 for control is smaller than the upper limit opening degree K1 for holding braking force (AP1<K1). When it is determined that the accelerator opening degree AP1 is smaller than the upper limit opening degree K1 for holding braking force, the flow shifts to step S14 in FIG. 4. K2 is, for example, set at 3%. In contrast to this, when it is determined in step S13 that the accelerator opening degree AP1 is equal to or greater than the upper limit opening degree K1 for holding braking force (AP1≧K1), the flow shifts to step S15, and the accelerator closed counter Cc is set at 0.

Further, the brake ECU 24 (FIG. 1) determines in step S14 whether or not the accelerator opening degree AP2 corresponding to the accelerator opening degree sensor 22 for defect detection is smaller than the upper limit opening degree K1 for holding braking force (AP2<K1). When it is determined that the accelerator opening degree AP2 is smaller than the upper limit opening degree K1 for holding braking force, the flow shifts to step S16. In step S16, the accelerator closed counter Cc is incremented by one. In contrast to this, when it is determined in step S14 that the accelerator opening degree AP2 is equal to or smaller than the upper limit opening degree K1 for holding braking force (AP2≧K1), the flow shifts to step S15, and the accelerator closed counter Cc is set at 0. That is, in this embodiment, only when both of the two accelerator opening degrees AP1 and AP2 are smaller than the upper limit opening degree K1 for holding braking force (AP1<K1 and AP2<K1), the flow shifts to step S16, and the accelerator closed counter Cc is incremented by one.

Next, after step S16 and step S15, the brake ECU 24 determines in step S17 whether or not the accelerator closed counter Cc is greater than a predetermined set value t1 set in advance (Cc>t1). When it is determined that the accelerator closed counter Cc is greater than the set value t1, the accelerator is determined to be closed in step S18, and the accelerator determination processing for brake-hold control is stopped. In contrast to this, when it is determined in step S17 that the accelerator closed counter Cc is equal to or smaller than the set value t1 (Cc≦t1), the determination result of the accelerator opening degree is not changed, and the flow shifts to step S19 and returns to step S12 again. The processing from step S12 to S17 and step 19 is repeated in a fixed routine period β (for example, 8 msec) until the flow shifts to step S18.

Returning to FIG. 3, if the accelerator opening degree is determined as a closed state in step S4, that is, the flow shifts to step S18 in FIG. 4, it is determined that the braking force holding condition 1 is satisfied, and the flow shifts to step S5 in FIG. 3, and it is determined whether or not an ON state of the brake pedal continues for a predetermined period T or longer, which is the remaining braking force holding conditions, using an ON/OFF state of the brake pedal indicated by the detection signal from the brake sensor 28 (FIG. 1). Then, when it is determined that an ON state of the brake pedal continues for the predetermined period T or longer, it is determined that all the braking force holding conditions are satisfied, and the brake ECU 24 (FIG. 1) maintains a braking force holding state, that is, holds the braking force by sending a control signal to activate the electromagnetic valve for holding braking force in step S6 in FIG. 3.

When the state shifts to the braking force holding state where the braking force is held in step S6 in FIG. 3, the above-described determination of the accelerator opening degree for brake-hold control shown in FIG. 4 is started again in step S7. However, at the point of step S7 in FIG. 3, because the accelerator opening degree is being determined as a closed state in step S18 in FIG. 4, the flow shifts from step S12 to S20 in FIG. 4.

In step S20, the brake ECU 24 determines whether or not the accelerator opening degree AP1 corresponding to the accelerator opening degree sensor 20 for control is greater than the lower limit opening degree K2 for releasing a held brake (AP1>K2). When it is determined that the accelerator opening degree AP1 is greater than the lower limit opening degree K2 for releasing a held brake, the flow shifts to step S21. K2 is, for example, set at 7%. In contrast to this, when it is determined in step S20 that the accelerator opening degree AP1 is equal to or smaller than the lower limit opening degree K2 for releasing a held brake (AP1≦K2), the flow shifts to step S22, and the accelerator open counter Co is set at 0.

Further, in step S21, the brake ECU 24 determines whether or not the accelerator opening degree AP2 corresponding to the accelerator opening degree sensor 22 for defect detection is greater than the lower limit opening degree K2 for releasing a held brake (AP2>K2). When it is determined that the accelerator opening degree AP2 is greater than the lower limit opening degree K2 for releasing a held brake, the flow shifts to step S23. In step S23, the brake ECU 24 increments the accelerator open counter Co by one. In contrast to this, when it is determined in step S21 that the accelerator opening degree AP2 is equal to or smaller than the lower limit opening degree K2 for releasing a held brake (AP2≦K2), the flow shifts to step S22, and the accelerator open counter Co is set at 0. That is, in this embodiment, only when the both of the two accelerator opening degrees AP1 and AP2 are greater than the lower limit opening degree K2 for releasing a held brake (AP1>K2 and AP2>K2), the flow shifts to step S23, and the accelerator open counter Co is incremented by one.

Next, after step S23 and step S22, the brake ECU 24 determines in step S24 whether or not the accelerator open counter Co is greater than a set value t2 set in advance (Co>t2). When it is determined that the accelerator open counter Co is greater than the set value t2, the accelerator is determined to be open in step S25, and the accelerator determination processing for brake-hold control is stopped. In contrast to this, when it is determined in step S24 that the accelerator closed counter Cc is equal to or smaller than the set value t2 (Cc≦t2), the result of the accelerator opening degree determination is not changed, and the flow shifts to step S19 and returns to step S12 again. The processing of step S12 and from step 20 to step 24 and step S19 is repeated in a fixed routine period β (for example, 8 msec) until the flow shifts to step S25.

Then, returning to FIG. 3, if the accelerator opening degree is determined as a closed state in step S8, that is, the flow shifts to step S25 in FIG. 4, the flow shifts to step S9 in FIG. 3, it is determined that the held-brake release conditions are satisfied, and the brake ECU 24 (FIG. 1) releases the held brake, that is, releases the braking force by sending a control signal for stopping the operation of the electromagnetic valve for holding braking force. That is, by gradually increasing the opening degree of the electromagnetic valve for holding braking force at a constant speed and then making the opening degree of the electromagnetic valve for holding braking force a fully opened state, the braking force is reduced and then released. When the held-brake release conditions are satisfied, it is also possible to make the opening degree of the electromagnetic valve a fully opened state immediately. If the braking force is released in step S9, the flow returns to step S1 again.

In the above-described FIG. 4, the set values t1 and t2 used in step S17 and step S24 may be the same value or different values. Further, the set values t1 and t2 correspond to a first set period γ1 and a second set period γ2, respectively, which are longer than the above-described normal/defective determining period α, and are respectively obtained by dividing the first set period γ1 and the second set period γ2 by the above-described fixed routine period β (t1=γ1/β, t2=γ2/β). Further, the normal/defective determining period α is set at, for example, 100 msec, and the first set period γ1 and the second set period γ2 are set, for example, at 108 msec.

Figure 5:
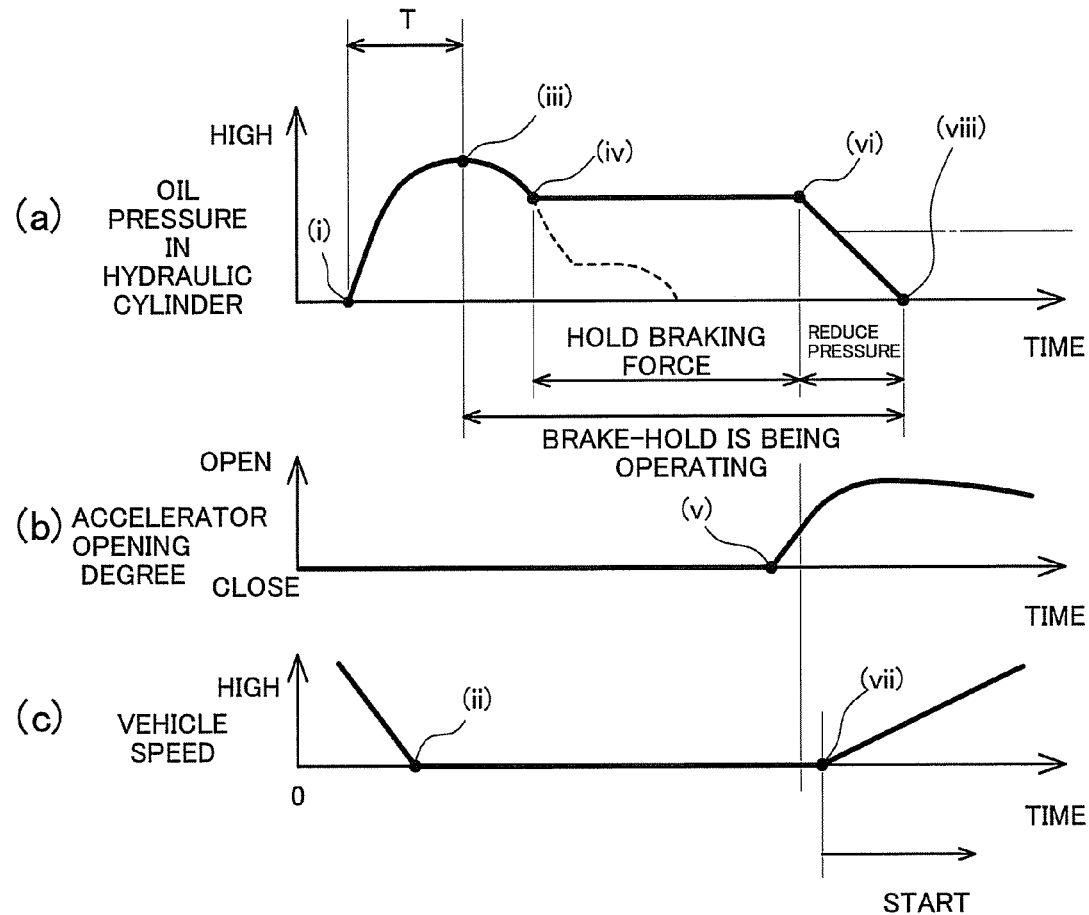
FIG. 5 is a diagram showing one example of time course of an oil pressure (a) in a hydraulic cylinder in a caliper of a hydraulic disk brake, an accelerator opening degree (b) and a vehicle speed (c), in a case where the hydraulic disk brake is used as a brake device in the first embodiment.

According to such a brake hold control device, if the driver turns on the brake-hold switch 30 (FIG. 1), and if the driver takes his foot off the accelerator pedal and depresses the brake pedal for a predetermined period in a stop state or approximately stopped state, it is possible to hold the braking force of the vehicle without further depressing the brake pedal and without turning ON a normal parking brake, that is, without activating a normal parking brake, and it is possible to realize a braking force holding state, which is a state where the stop state of the vehicle is maintained. This will be described using FIG. 5. FIG. 5 shows one example of time course of an oil pressure (a) in a hydraulic cylinder in a caliper of a hydraulic disk brake, an accelerator opening degree (b) and a vehicle speed (c) in a case where the hydraulic disk brake is used as a brake device. First, when the accelerator opening degree is set at 0 during running and the brake pedal is depressed, braking force is started from a point (i) in FIG. 5(a), and the vehicle speed becomes 0 at a point (ii) in FIG. 5(c). If the driver continues to depress the brake pedal even after the vehicle speed becomes 0, an ON state of the brake pedal continues for a predetermined period T or longer. Therefore, if both of the accelerator opening degrees AP1 and AP2 corresponding to the two accelerator opening degree sensors 20 and 22 (FIG. 1) are smaller than the upper limit opening degree K1 for holding braking force, the electromagnetic valve for holding braking force operates from a point (iii) in FIG. 5(a), and the state becomes a braking force holding state.

Although the driver reduces the pressure on the brake pedal after the point (iii) in FIG. 5(a), the oil pressure of the hydraulic cylinder remains at a fixed pressure after a point (iv) in FIG. 5(a) because of operation of the electromagnetic valve for holding braking force. A dot line in FIG. 5(a) shows a change of the oil pressure in the hydraulic cylinder in accordance with a change of the pressure the driver depresses the brake pedal, assuming that the state does not become the braking force holding state. Next, the driver depresses the accelerator pedal at a point (v) in FIG. 5(b). If, by this depression, the accelerator opening degree increases gradually and both of the accelerator opening degrees AP1 and AP2 corresponding to the two accelerator opening degree sensors 20 and 22 (FIG. 1) are greater than the lower limit opening degree K2 for releasing a held brake, the braking force is reduced after a point (vi) in FIG. 5(a), and the oil pressure in the hydraulic cylinder is gradually reduced at a fixed rate, that is, the pressure is reduced. Then, at a point (vii) in FIG. 5(c), driving force by the driving source of the vehicle matches running resistance, the vehicle starts, and acceleration is started. That is, when the accelerator pedal is depressed from a state where the stop state is maintained, the vehicle starts smoothly. Further, the oil pressure in the hydraulic cylinders in the calipers provided corresponding to four or two wheels becomes 0 at a point (viii) in FIG. 5(a), and the state becomes a held-brake release state. Further, when the vehicle starts at a climbing road, the state where the stop state is maintained can be achieved without the brake pedal being depressed, so that it is possible to eliminate inconvenience that the vehicle slides down while the driver moves his foot from the brake pedal to the accelerator pedal.

The brake hold control device according to this embodiment has an brake actuator 32 provided with an electromagnetic valve for holding braking force that holds the braking force of the vehicle, two accelerator opening degree sensors 20 and 22 for control and for defect detection that detect an accelerator opening degree corresponding to the amount of operation of the accelerator pedal, and a brake ECU 24 that receives detection signals from the two accelerator opening degree sensors 20 and as input, in which the brake ECU 24 controls the electromagnetic valve for holding braking force to hold the braking force when predetermined braking force holding conditions are satisfied, and controls the electromagnetic valve for holding braking force to release the braking force when predetermined held-brake release conditions including accelerator opening degree conditions for releasing a held brake are satisfied. Further, the accelerator opening degree conditions for releasing a held brake are set such that the accelerator opening degrees AP1 and AP2 corresponding to the detection signals from both of the two accelerator opening degree sensors 20 and 22 are greater than a predetermined lower limit opening degree K2 for releasing a held brake (AP1>K2 and AP2>K2). Therefore, even if the accelerator opening degree AP1 (or AP2) corresponding to the detection signal from one accelerator opening degree sensor 20 (or 22) out of the two accelerator opening degree sensors 20 and 22, is greater than the lower limit opening degree K2 for releasing a held brake, if the accelerator opening degree AP2 (or AP1) corresponding to the detection signal from the other accelerator opening degree sensor 22 (or 20) is equal to or smaller than the lower limit opening degree K2 for releasing a held brake, the held-brake release conditions are not satisfied. In short, even if a defect occurs in one accelerator opening degree sensor 20 (or 22) out of the two accelerator opening degree sensors 20 and 22 while a stop state of the vehicle, which is a braking force holding state, is maintained, and the accelerator opening degree AP1 (or AP2) increases to be greater than the lower limit opening degree K2 for releasing a held brake, the accelerator opening degree is not determined to indicate that the accelerator is open in accelerator opening degree determination for releasing the braking force holding state. Therefore, even if one sensor 20 (or 22) out of the two accelerator opening degree sensors 20 and 22 includes a defect such as a failure, before it is determined that one sensor 20 (or 22) is defective, it is possible to prevent the braking force from being released while the braking force is held and effectively prevent start of the vehicle not expected by the driver. As a result, it is possible to effectively ensure safety of the hybrid vehicle 10, which is a vehicle with the brake hold control device.

In addition, the braking force holding conditions include accelerator opening degree conditions for holding braking force, and the accelerator opening degree conditions for holding braking force are set such that the accelerator opening degrees AP1 and AP2 corresponding to the detection signals from both of the two accelerator opening degree sensors 20 and 22 are smaller than the upper limit opening degree K1 for holding braking force (AP1<K1 and AP2<K1). Therefore, even if the accelerator opening degree AP1 (or AP2) corresponding to the detection signal from one accelerator opening degree sensor 20 (or 22) out of the two accelerator opening degree sensors 20 and 22 is smaller than the upper limit opening degree K1 for holding braking force, if the accelerator opening degree AP2 (or AP1) corresponding to the detection signal from the other accelerator opening degree sensor 22 (or 20) is equal to or greater than the upper limit opening degree K1 for holding braking force, the braking force holding conditions are not satisfied. In short, even if a defect occurs in one accelerator opening degree sensor 20 (or 22) out of the two accelerator opening degree sensors 20 and 22 in an approximately stopped state such as a creep state, or a stop state, which is the held-brake release state, and the accelerator opening degree AP1 (or AP2) decreases to be smaller than the upper limit opening degree K1 for holding braking force, the accelerator opening degree is not determined to indicate that the accelerator is closed in the accelerator opening degree determination for shifting the state to the braking force holding state. Therefore, even if one sensor 20 (or 22) out of the two accelerator opening degree sensors 20 and 22 includes a defect such as a failure, the braking force is not held before it is determined that the sensor 20 (or 22) is defective, and it is possible to effectively prevent the state from shifting to the braking force holding state when the accelerator opening degree sensor 20 (or 22) is defective.

If the state does not shift to the braking force holding state, because the behavior of the vehicle in response to the operation of the driver is the same as that of a normal vehicle which does not have the brake hold control device, the driver can readily respond to the behavior of the vehicle. Further, even if the vehicle speed sensor 26 and the brake sensor 28 for determining the braking force holding conditions are defective, it is possible to prevent the state from shifting to the braking force holding state unexpectedly due to erroneous determination that the driver takes his foot off the accelerator pedal. Further, because the state does not shift to the braking force holding state, it is readily determined that the accelerator opening degree sensor 20 (or 22) is defective. As a result, it is possible to effectively ensure safety of the hybrid vehicle 10, which is a vehicle with the brake hold control device.

In FIG. 5(a), if a defect in the accelerator opening degree sensor 20 (or 22) is detected when the oil pressure in the hydraulic cylinder is reduced from a braking force holding state, to release the braking force, as shown in one-dot dashed line in FIG. 5(a), it is also possible to return the state to the braking force holding state by maintaining a fixed oil pressure in the hydraulic cylinder. In this case, the electromagnetic valve for holding braking force is closed.

Instead of determining whether or not an ON state of the brake pedal continues for the predetermined period T or longer in the above-described step S5 shown in FIG. 3, it is also possible to determine whether or not an ON state of the brake pedal continues for the predetermined period T or longer after the vehicle speed V is lower than the predetermined speed V1 in step S2 or after the accelerator opening degree is determined as a closed state in step S4, and make the flow shift to step S6 when it is determined that the ON state of the brake pedal continues for the predetermined period T or longer. Further, instead of determining whether or not the ON state of the brake pedal continues for the predetermined period T or longer in step S5 in FIG. 3, it is also possible to determine whether or not the pressure applied to the brake pedal is equal to or greater than a predetermined pressure, or whether or not the pressure exceeds a normal reference depressed pressure, that is, whether or not the brake pedal is further depressed, and make the flow shifts to step S6 when it is determined that the brake pedal is further depressed.

Second Embodiment

Figure 6:
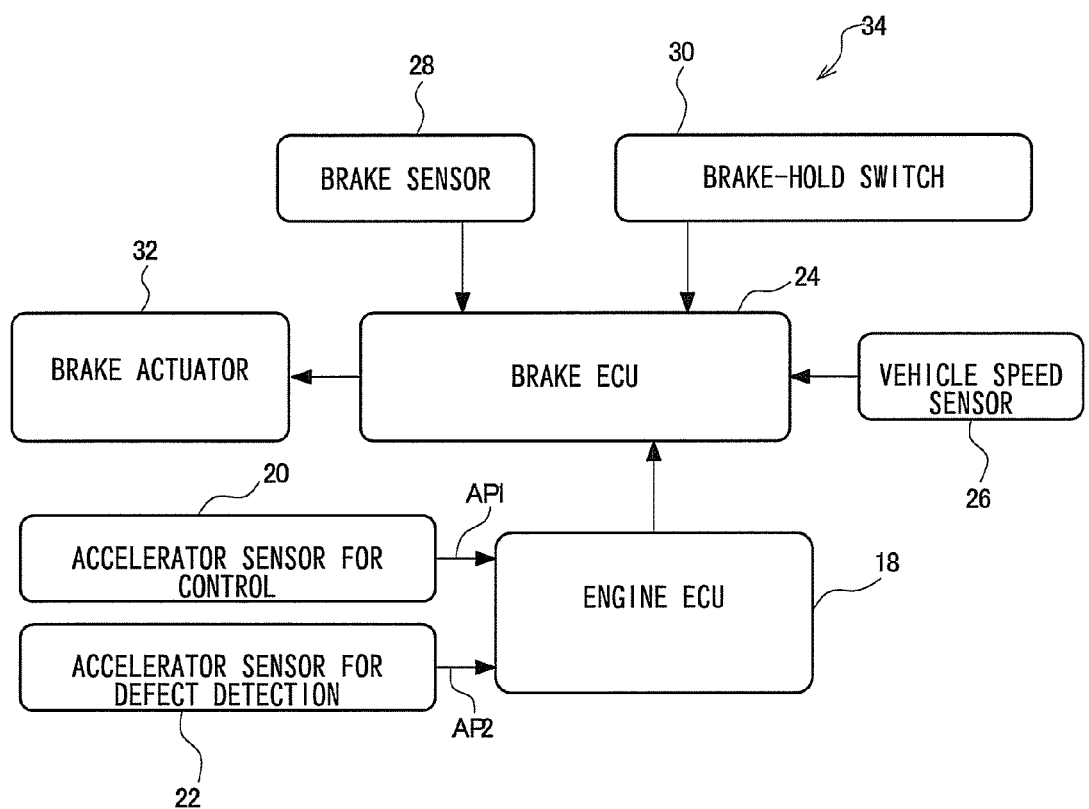
FIG. 6 is a block diagram schematically showing a structure of a vehicle with an engine, which is a vehicle with a brake hold control device provided with the brake hold control device according to a second embodiment of the present invention.

FIG. 6 is a block diagram schematically showing a structure of the second embodiment of the present invention and showing a vehicle 34 with an engine, which is a vehicle with the brake hold control device, and corresponding to FIG. 1. In the case of the above-described first embodiment, a case has been described where the present invention is applied to the hybrid vehicle 10 (see FIG. 1) which uses the engine and the running motor 12 (see FIG. 1) as a driving source. In contrast to this, in this embodiment, the present invention is applied to a common vehicle 34 with an engine which uses only an engine as a driving source of the vehicle. Therefore, in this embodiment, the HV-ECU 16, the inverter 14 and the running motor 12 are removed from the above-described configuration in FIG. 1, and the detection signals from the two accelerator opening degree sensors 20 and 22 for control and for defect detection are sent to an engine ECU 18, which is an ECU that computes a driving force. Then, the detection signals from the two accelerator opening degree sensors 20 and 22 are inputted to the brake ECU 24 via the engine ECU 18.

In the case of the brake hold control device which is provided to such a vehicle 34 with an engine, as in the above-described first embodiment, the brake ECU 24 activates the electromagnetic valve for holding braking force to hold braking force and creates a braking force holding state when predetermined braking force holding conditions including the accelerator opening degree conditions for holding braking force are satisfied. Further, the braking force holding conditions are set such that the vehicle speed V is lower than the predetermined speed V1 set in advance, an ON state of the brake pedal continues for a predetermined period T or longer, and the accelerator opening degree conditions for holding braking force are satisfied. Further, the accelerator opening degree conditions for holding braking force are set such that both of the accelerator opening degrees AP1 and AP2 indicated by the detection signals from both of the two accelerator opening degree sensors 20 and 22, that is, corresponding to the detection signals from both of the accelerator opening degree sensors 20 and 22, are smaller than the predetermined opening degree K1 for holding braking force (AP1<K1 and AP2<K1).

Further, when the predetermined held-brake release conditions including accelerator opening degree conditions for releasing a held brake are satisfied, the brake ECU 24 stops the operation of the electromagnetic valve for holding braking force to create the held-brake release state where the braking force is released. The held-brake release conditions are set such that the accelerator opening degree conditions for releasing a held brake are satisfied, and the accelerator opening degree conditions for releasing a held brake are set such that both of the accelerator opening degrees AP1 and AP2 corresponding to the detection signals from both of the two accelerator opening degree sensors 20 and 22 are greater than the predetermined lower limit opening degree K2 for releasing a held brake (AP1>K2 and AP2>K2).

Also in this embodiment, it is possible to effectively ensure safety of the vehicle 34 with an engine, which is a vehicle with the brake hold control device. Because the other components and advantages are the same as those in the first embodiment, the same parts are assigned with the same reference numerals, and overlapping illustration and description will be omitted.

Further, although a case has been described in the above-described embodiments where the two accelerator opening degree sensors 20 and 22 are provided, it is also possible to provide three or more accelerator opening degree sensors. Furthermore, in this case, the accelerator opening degree conditions for releasing a held brake are set such that the accelerator opening degrees corresponding to the detection signals from all the plurality of accelerator opening degree sensors are greater than a predetermined lower limit opening degree for releasing a held brake, and the accelerator opening degree conditions for holding braking force are set such that the accelerator opening degrees corresponding to the detection signals from all the plurality of accelerator opening degree sensors are smaller than a predetermined upper limit opening degree for holding braking force.

The invention claimed is:

1. A brake hold control device comprising:
a braking force holding section that holds braking force of a vehicle;
a plurality of accelerator opening degree sensors that detect an accelerator opening degree corresponding to an amount of operation of an accelerator pedal;
a defect determining section that detects a defect of the accelerator opening degree sensor; and
a control section that receives detection signals from the plurality of accelerator opening degree sensors as input, wherein:
when predetermined braking force holding conditions including accelerator opening degree conditions for holding braking force are satisfied, the control section controls the braking force holding section to hold the braking force, and, when predetermined held-brake release conditions including accelerator opening degree conditions for releasing a held brake are satisfied, the control section controls the braking force holding section to release the braking force;
the accelerator opening degree conditions for holding braking force are set such that accelerator opening degrees corresponding to the detection signals from all the plurality of accelerator opening degree sensors are smaller than a predetermined upper limit opening degree for holding braking force;
the accelerator opening degree conditions for releasing a held brake are set such that accelerator opening degrees corresponding to the detection signals from all the plurality of accelerator opening degree sensors are greater than a predetermined lower limit opening degree for releasing a held brake; and
the accelerator opening degree conditions for holding braking force and the accelerator opening degree conditions for releasing a held brake are satisfied before it is determined by the defect determining section that the accelerator opening degree sensor is defective.

2. The brake hold control device according to claim 1, further comprising:
a vehicle speed sensor that detects a vehicle speed; and
a brake sensor that detects an ON/OFF state of a brake pedal, wherein:
the control section receives detection signals from the vehicle speed sensor, the brake sensor and the plurality of accelerator opening degree sensors as input;
the braking force holding conditions are set such that the vehicle speed is equal to or lower than a predetermined speed, an ON state of the brake pedal continues for a predetermined period or longer, and the accelerator opening degree conditions for holding braking force are satisfied; and
the held-brake release conditions are set such that the accelerator opening degree conditions for releasing a held brake are satisfied.

3. A brake hold control device comprising:
a braking force holding section that holds braking force of a vehicle;
a plurality of accelerator opening degree sensors that detect an accelerator opening degree corresponding to an amount of operation of an accelerator pedal;
a defect determining section that determines a defect of the accelerator opening degree sensor; and
a control section that receives detection signals from the plurality of accelerator opening degree sensors as input, wherein:
when predetermined braking force holding conditions are satisfied, the control section controls the braking force holding section to hold the braking force, and, when predetermined held-brake release conditions are satisfied, the control section controls the braking force holding section to release the braking force, and,
before it is determined that the accelerator opening degree sensor is defective, and, when at least two accelerator opening degrees are different out of the accelerator opening degrees corresponding to the detection signals from the plurality of accelerator opening degree sensors, the control section continues an operating stopped state to continue to maintain a held-brake release state.

* * * * *